(12) United States Patent
Campbell et al.

(10) Patent No.: US 7,025,800 B2
(45) Date of Patent: Apr. 11, 2006

(54) METHODS OF MEASURING THE DIFFUSION RATE AND PARTITION COEFFICIENT OF AN ANALYTE INTO A POLYMER AND METHODS OF FORMING A FILTER MEDIA

(75) Inventors: Daniel P. Campbell, Atlanta, GA (US); Jim Suggs, Corning, NY (US); Srinivas Somayajula, Woodbury, MN (US); Thomas R. Mohs, Eagan, MN (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/693,670

(22) Filed: Oct. 24, 2003

(65) Prior Publication Data
US 2005/0122572 A1 Jun. 9, 2005

(51) Int. Cl.
*B01D 39/14* (2006.01)
*G01B 9/02* (2006.01)
*G01B 21/45* (2006.01)

(52) U.S. Cl. .................. 55/522; 356/477; 356/481; 356/517

(58) Field of Classification Search .................. 55/522; 95/273; 356/450, 477, 481, 517
See application file for complete search history.

(56) References Cited

U.S. PATENT DOCUMENTS

| 3,615,024 A | * | 10/1971 | Michaels ............... 210/490 |
| 3,727,379 A | | 4/1973 | Bijleveld et al. |
| 4,650,329 A | * | 3/1987 | Barrett et al. ............ 356/481 |
| 4,863,494 A | | 9/1989 | Hayes |
| 4,863,495 A | | 9/1989 | Rafson |
| 4,892,719 A | | 1/1990 | Gesser |
| 5,037,624 A | | 8/1991 | Tom et al. |
| 5,281,257 A | | 1/1994 | Harris |
| 5,346,535 A | | 9/1994 | Kuznicki et al. |
| 5,529,609 A | | 6/1996 | Gooch et al. |
| 5,627,329 A | | 5/1997 | Krishnan et al. |
| 5,681,788 A | | 10/1997 | Kanesaka et al. |
| 5,702,505 A | | 12/1997 | Izumi et al. |
| 5,830,414 A | | 11/1998 | Ishii et al. |
| 5,891,221 A | | 4/1999 | Rohrbach et al. |
| 5,944,878 A | | 8/1999 | Lindhe |
| 5,951,774 A | | 9/1999 | Shishiguchi et al. |
| 6,083,439 A | | 7/2000 | Nastke et al. |
| 6,093,236 A | | 7/2000 | Klabunde et al. |

(Continued)

FOREIGN PATENT DOCUMENTS

EP 0 417 407 3/1991
SU 639 582 12/1978

OTHER PUBLICATIONS

Gesser et al., "The Use of Reactive Coatings on Filters for the Removal of Indoor Gaseous Pollutants," *Environmental International*, vol. 18, No. 5, pp. 463-466, 1992.

(Continued)

*Primary Examiner*—Robert A. Hopkins
(74) *Attorney, Agent, or Firm*—Merchant & Gould P.C.

(57) ABSTRACT

A method of determining the diffusion rate of a given analyte into a polymer film using an optical waveguide interferometer is disclosed. A method of forming a filter media by selecting a polymer for the sorbent system of the filter media based on the diffusion rate of a given analyte into a given polymer as measured by an optical waveguide interferometer is further disclosed.

15 Claims, 4 Drawing Sheets

U.S. PATENT DOCUMENTS

| | | |
|---|---|---|
| 6,187,276 B1 | 2/2001 | Sata |
| 6,228,135 B1 | 5/2001 | Sugo et al. |
| 6,358,374 B1 | 3/2002 | Obee et al. |

OTHER PUBLICATIONS

Dallüge et al., "Unravelling the Composition of Very Complex Samples by Comprehensive Gas Chromatography Coupled to Time-Of-Flight Mass Spectrometry Cigarette Smoke," *Journal of Chromatography*, vol. 974, Issues 1-2, pp. 169-184, Oct. 2002.

Shaughnessy et al., "Indoor Chemistry: Ozone and Volatile Organic Compounds Found in Tobacco Smoke," *Environmental Science & Technology*, vol. 35, No. 13, pp. 2758-2764, Jul. 1, 2001.

Lewis et al., "Properties of Vapor Detector Arrays Formed Through Plasticization of Carbon Black-Organic Polymer Composites," *Analytical Chemistry*, vol. 74, No. 6, pp. 1307-1315, Mar. 15, 2002.

\* cited by examiner

METHODS OF MEASURING THE DIFFUSION RATE AND PARTITION COEFFICIENT OF AN ANALYTE INTO A POLYMER AND METHODS OF FORMING A FILTER MEDIA

FIELD OF THE INVENTION

The present invention is directed to a method of determining the diffusion rate and partition coefficient of a given analyte into a polymer film using an optical waveguide interferometer. The present invention is further directed to a method of forming a filter media by selecting a polymer for the sorbent system of the filter media based on the diffusion rate of a given analyte into the selected polymer as measured by an optical waveguide interferometer.

BACKGROUND OF THE INVENTION

Known methods of measuring the diffusion rate of a given analyte into a polymer film involve the use of Attenuated Total Reflectance Fourier Transform Infrared Spectroscopy (ATR-FTIR). Such methods using an ATR-FTIR system have a number of shortcomings including, but not limited to, (1) high equipment costs, (2) an overlap of spectral absorbances of the analyte and the polymer tested, and (3) a conventionally accepted degree of sensitivity.

What is needed in the art is a method of measuring the diffusion rate of an analyte into a polymer, which overcomes one or more of the above-described shortcomings of known methods, such as methods using an ATR-FTIR system. What is needed in the art is a method of measuring the diffusion rate of a given analyte into a polymer film, wherein the method has at least one of: (1) lower equipment costs, (2) elimination of the overlap of spectral absorbances of the analyte and the polymer tested, and (3) a greater degree of sensitivity compared to methods using an ATR-FTIR system.

SUMMARY OF THE INVENTION

The present invention addresses some of the difficulties and problems discussed above by the discovery of a method for measuring a diffusion rate of an analyte into a polymer using an optical waveguide interferometer, wherein the method (1) has lower equipment costs, (2) eliminates any spectral overlap of absorbances of the analyte and the polymer tested, and (3) has a greater degree of sensitivity compared to methods using an ATR-FTIR system. The method of the present invention measures a phase change, or a change in a propagating light speed, within an evanescent field of an optical planar waveguide. The evanescent field of the optical planar waveguide is in the volume immediately above the waveguide surface, extending up about 5000 angstroms from the waveguide surface. By placing a polymer film in this field and exposing the polymer to an analyte, polymer/analyte interactions cause a change in the index of refraction, which causes a change in the propagating light speed, or phase, within the evanescent field. By analyzing the phase change, diffusion rate data of a given analyte into a given polymer may be obtained. Further, when the analyte and polymer are in equilibrium with one another, partition coefficients of a given analyte/polymer combination may also be obtained.

In one exemplary embodiment of the present invention, the method of determining a diffusion rate of an analyte into a polymer comprises the steps of measuring a phase change within an evanescent field of an optical planar waveguide for a polymer/analyte combination. The exemplary method may further include method steps such as (a) positioning a test sample of a first polymer within a test sample region of an optical waveguide interferometer; (b) positioning a reference sample of the first polymer within a reference sample region of the optical waveguide interferometer; (c) passing a first beam of light though the test sample region to produce a sensing beam of light exiting the optical waveguide interferometer while simultaneously passing a second beam of light through the reference sample region to produce a reference beam of light exiting the optical waveguide interferometer; (d) optically combining a first propagating light speed of the sensing beam of light with a second propagating light speed of the reference beam of light to create an interference pattern of alternating dark and light fringes; (e) processing the interference pattern through a two-dimensional array detector to produce a signal output; (f) converting the signal output to a phase change output using a Fourier transform signal processor; and (g) using a mathematical algorithm to convert the phase change output into a diffusion rate of the first analyte into the first polymer.

The present invention is further directed to a method of making a filter media. The method may comprising one or more of the following steps: (a) measuring a diffusion rate of a first analyte into a first polymer using an optical planar waveguide interferometer; and (b) if the diffusion rate of the first analyte into the first polymer as measured by the optical planar waveguide interferometer is greater than or equal to a desired diffusion rate value, incorporating the first polymer into a sorbent system of a filter media.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a method for measuring a diffusion rate and a partition coefficient of an analyte into a polymer using an apparatus, which measures a phase change within an evanescent field of an optical planar waveguide for a given polymer/analyte combination. The present invention is further directed to a method of making a filter comprising a step of selecting a polymeric sorbent material based on diffusion rate data and/or partition coefficient data of a given analyte into a polymer using an apparatus, which measures a phase change within an evanescent field of an optical planar waveguide for a given polymer/analyte combination. A description of the methods of the present invention is provided below.

I. Methods For Measuring Diffusion Rates And Partition Coefficients

Figure 1:
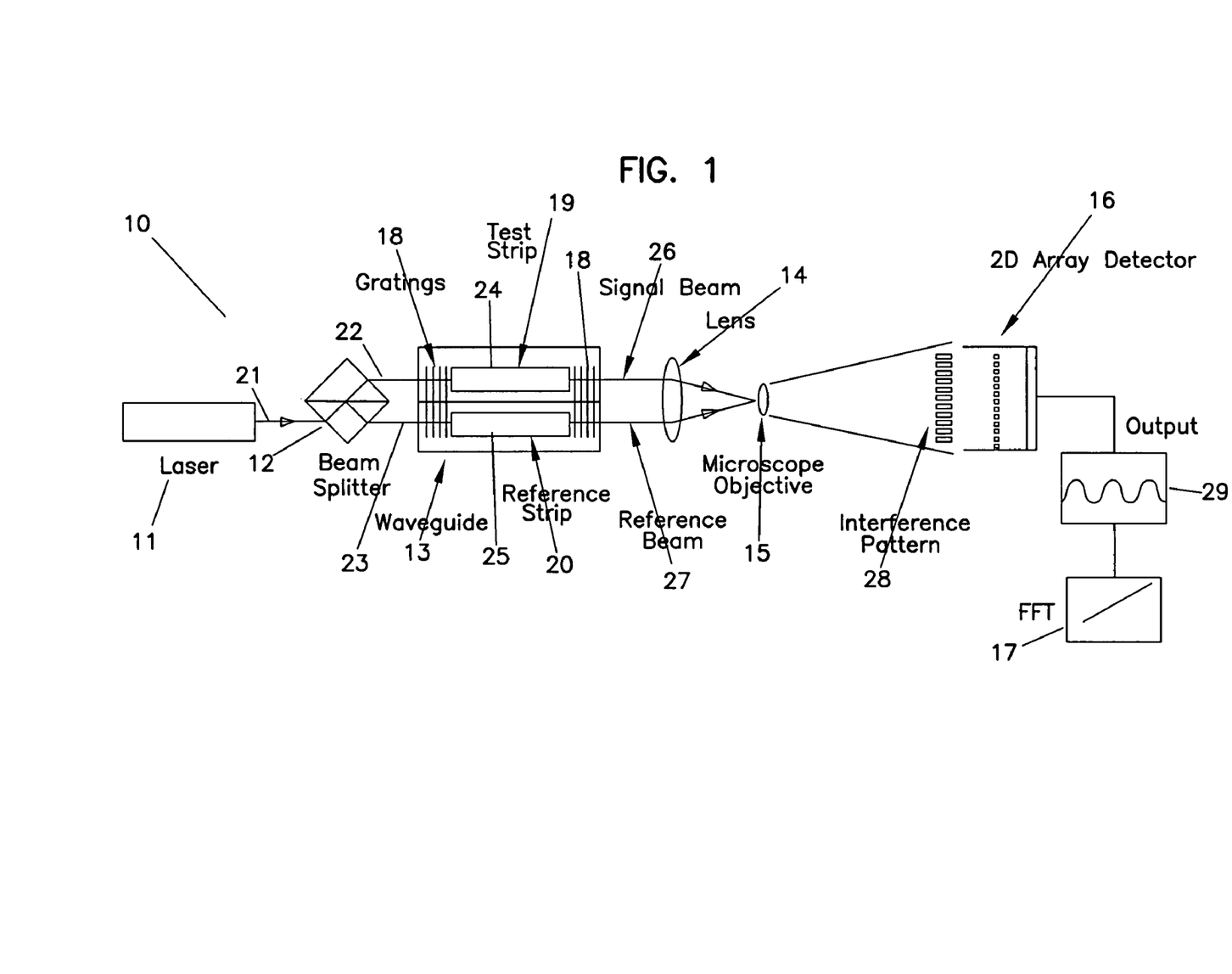
FIG. 1 provides an exemplary schematic representation of an apparatus for measuring a diffusion rate and a partition coefficient of a given analyte into a given polymer according to the present invention.

The present invention is directed to methods for measuring a diffusion rate and/or a partition coefficient of an analyte into a polymer using an apparatus. An exemplary apparatus for measuring the diffusion rate and/or partition coefficient of an analyte into a polymer is shown in FIG. 1. As shown in FIG. 1, exemplary apparatus 10 comprises laser beam source 11, beam splitter 12, optical waveguide interferometer 13, lens 14, microscope objective 15, 2D array detector 16, and Fourier transform signal software 17. Optical waveguide interferometer 13 may further comprise gratings 18, test sample region 19, and reference sample region 20.

It should be noted that other suitable apparatus for measuring the diffusion rate of an analyte into a polymer may be used in place of exemplary apparatus 10 shown in FIG. 1. For example, other suitable apparatus may possess a design, which eliminates, replaces, or combines one or more of the above-mentioned components of exemplary apparatus 10. In one suitable apparatus, the beam splitter 12 may be replaced with any other beam splitting means, or two separate, identical beams can be generated initially. In another suitable apparatus, the microscope objective 15 may be replaced or eliminated by using other means to expand an interference pattern (described below).

The components of the above-described apparatus may be purchased from a number of equipment supply stores. One possible source any of the above-described components is Edmunds Scientific (Tonawanda, N.Y.)(Internet sites include www.scientificsonline.com, www.edmundoptics.com and www.anchoroptical.com).

The method for measuring a diffusion rate of an analyte into a polymer may be described with reference to apparatus 10 of FIG. 1. Laser beam source 11 generates a single beam of light 21, which is split into two beams of light 22 and 23 via beam splitter 12. Beams of light 22 and 23 enter optical waveguide interferometer 13. Beam of light 22 passes through test sample region 19, while beam of light 23 passes through reference sample region 20. Beam of light 22 interacts with a polymer test sample 24 positioned within test sample region 19. Beam of light 23 interacts with a polymer reference sample 25 positioned within reference sample region 20. A sensing beam of light 26 exits test sample region 19 of optical waveguide interferometer 13. A reference beam of light 27 exits reference sample region 20 of optical waveguide interferometer 13.

Lens 14 directs sensing beam of light 26 and reference beam of light 27, and combines the two beams at a surface of microscope objective 15. Microscope objective 15 produces an interference pattern 28 of alternating dark and light fringes resulting from (i) a first propagating light speed of sensing beam of light 26 and (ii) a second propagating light speed of reference beam of light 27, which is detected by 2D array detector 16. 2D array detector 16 images interference pattern 28 and measures any change that would produce a sinusoidal signal output 29, which is further processed using Fourier transform signal software 17 to convert sinusoidal signal output 29 into a phase change output (not shown). A mathematical algorithm is used to convert the phase change output into a diffusion rate for a given analyte into a given polymer.

Figure 2:
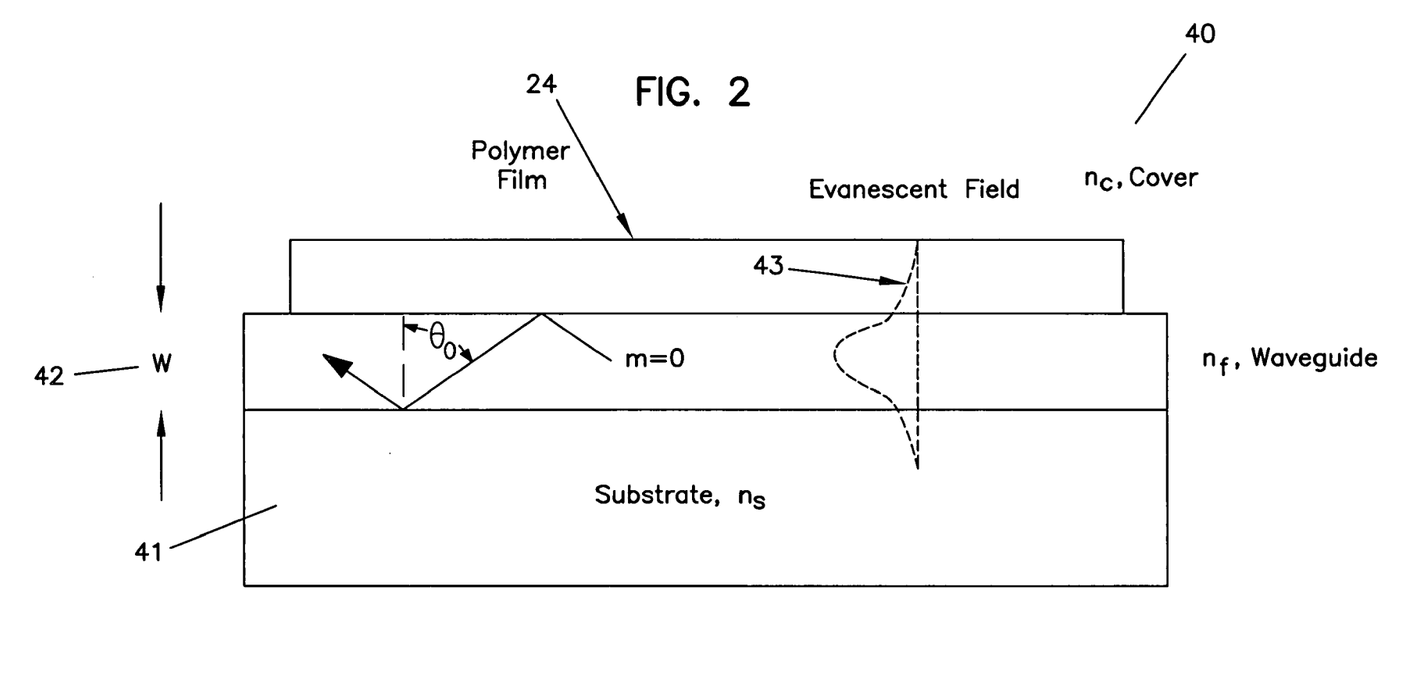
FIG. 2 depicts an exemplary schematic representation of an evanescent field of an optical planar waveguide used to measure a diffusion rate and a partition coefficient of a given analyte into a given polymer.

When an analyte (not shown) is introduced into test sample region 19 of optical waveguide interferometer 13, polymer/analyte interactions cause a change in the refraction index of the evanescent field above the waveguide. Such an occurrence is schematically depicted in FIG. 2. As shown in FIG. 2, system 40 comprises substrate 41, waveguide 42 having height W, and polymer test sample 24 positioned above waveguide 42 within evanescent field 43. Evanescent field 43 extends above waveguide 42 into polymer test sample 24. Analyte interacts with polymer test sample 24 resulting in a change in the refraction index of the polymer, which effects the evanescent field 43 causing a change in the propagating light speed, or phase, of beam of light 22 traveling through test sample region 19. The perturbed beam of light (i.e., the sensing beam of light 26) is compared to the unchanged reference beam of light 27 to produce an interferometric sensor response, which is converted into a phase change output as described above.

An amount of phase change output may be associated with a given change in the index of refraction of a sample polymer by calibrating the optical waveguide interferometer of the above-described apparatus. An exemplary calibration procedure may comprise (i) measuring the phase change output signal of an initial solution having a known index of refraction (e.g., deionized water, index of refraction of 1.33) is placed on the waveguide (see exemplary waveguide 42 of FIG. 2), (ii) gradually adding a salt solution (e.g., NaCl solution) to the initial solution to cause a gradual change in the index of refraction of the solution mixture, (iii) measuring the phase change output signal as the index of refraction of the solution mixture changes, (iv) measuring the final index of refraction of the solution mixture using a refractometer (e.g., an aqueous salt solution having a final index of refraction of 1.35) and (v) determining the amount of phase change per amount of refractive index change per unit length (i.e., based on the length of the test area of the tested sample on the waveguide).

It should be noted that the above-described calibration procedure can be performed using other initial solutions and added components to cause a gradual change in the index of refraction of the initial solution. Another possible solution combination is hexane/toluene.

Figure 3:
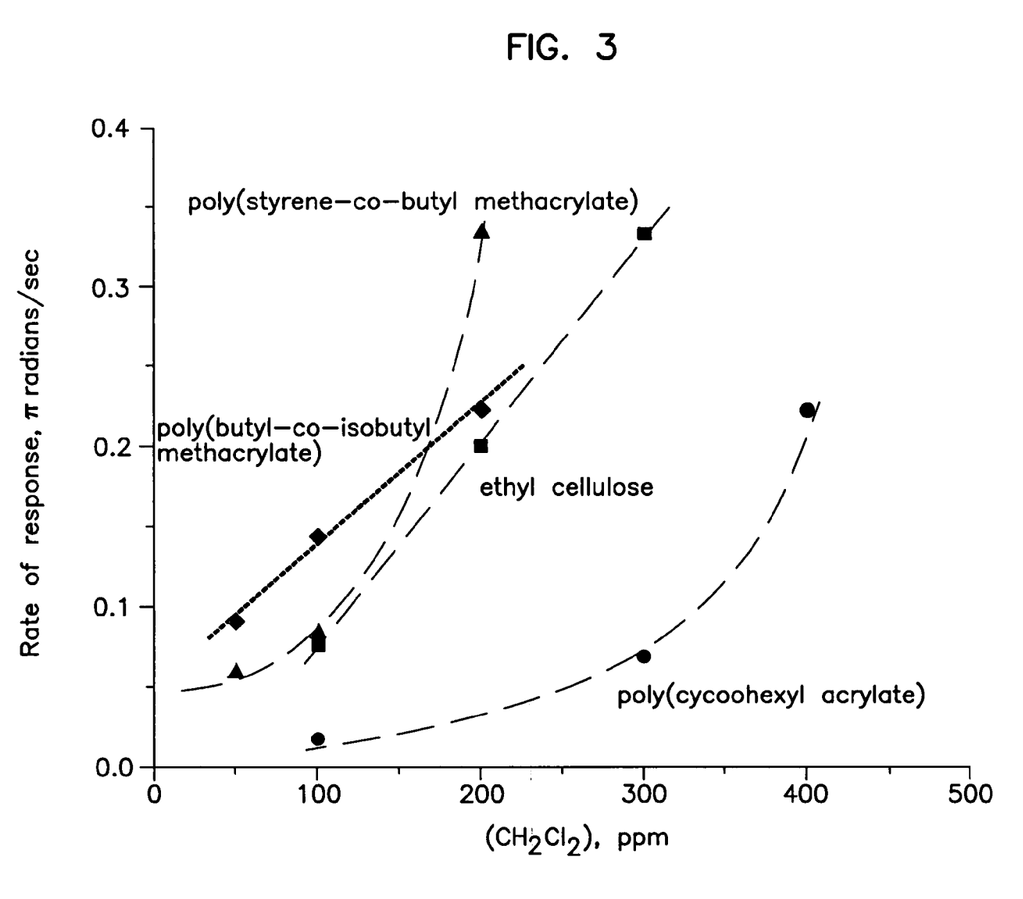
FIG. 3 depicts a graph detailing diffusion rate data of methylene chloride into a variety of polymers using the method of the present invention.

By analyzing the phase change and the rate of phase change, diffusion rate data of a given analyte into a given polymer may be obtained. FIG. 3 graphically displays exemplary diffusion data obtained using the method of the present invention. As shown in FIG. 3, a given analyte, methylene chloride, diffuses into a variety of polymers at different rates. For example, methylene chloride diffuses into poly(styrene-co-butylmethacrylate) at a much faster rate than into poly(cyclohexyl acrylate).

The rate of phase change measured by the above-described apparatus may be converted to a diffusion coefficient, D, of a given analyte into a given polymer using the following mathematical expressions. As a given analyte diffuses into a given polymer, the analyte's index of refraction is added to the polymer's index of refraction. For a simple binary mixture, the following equation applies:

$$Ax+By=Cz$$

wherein: x is the index of refraction of the polymer;
y is the index of refraction of the analyte being absorbed;
A is the molar fraction of the polymer in the polymer/analyte mixture;
B is the molar fraction of the analyte in the polymer/analyte mixture;
z is the index of refraction of the polymer/analyte mixture; and
C is the total molar fraction of the polymer/analyte mixture. Since C=A+B=1, the following equations apply:

$$Ax+(1-A)y=z, \text{ and}$$

$$(1-B)x+By=z.$$

Indices of refraction of the polymer and the analyte, x and y respectively, may be obtained from the literature or measured on a refractometer.

As the index of refraction of the polymer/chemical mixture, z, changes, the refraction index of the evanescent field above the waveguide also changes resulting in a phase change as discussed above. The phase change at any time, t, is related to the diffusion coefficient, D, by the following equations as described in *Study Of The Impact Of Penetrant Characteristics Upon Diffusion Into TEFLON® Membranes To Further Assess The Performance Of An ATR/FTIR Sensor* by Murphy et al., Anal. Bioanal. Chem. (2003) 377, 195–202:

$$\frac{\Phi}{\Phi_\infty} = 1 - \frac{8}{\pi d_p (1-e^{-2L/d_p})} \sum_{n=0}^{\infty} \frac{e^g [f e^{-2L/d_p} + (-1)^n (2/d_p)]}{(2n+1)(4/d_p^2 + f^2)}$$

$$f = \frac{(2n+1)\pi}{2L}, \text{ and}$$

$$g = \frac{-D(2n+1)^2 \pi^2 t}{4L^2}$$

wherein:
$\Phi$ is the phase change at time t,
$\Phi_\infty$ is the phase change at equilibrium,
L is the thickness of the polymer film,
$d_p$ is the penetration depth of the evanescent field wave (i.e., the perpendicular distance from an interface at which the evanescent field falls by 63% of its initial magnitude).

The penetration depth, $d_p$, is determined by inputting process parameters into a mathematical model described as "1D Multilayer Slab Waveguide Mode Solver" on the following website of the University of Twente, Netherlands, wwwhome.math.utwente.nl/~hammer/oms.html. The following parameters are inputted into the mathematical model: (1) the wavelength of the light source; (2) the index of refraction of the polymer test sample; (3) the index of refraction of the waveguide layer (see exemplary waveguide layer 42 of FIG. 2) (e.g., any optical medium such as $Si_3N_4$ having an index of refraction of about 1.85); (4) the thickness of the waveguide layer (typically from about 1000 to 2000 angstroms); and (5) the index of refraction of the substrate underneath the waveguide layer (i.e., substrate 41 shown in FIG. 2) (e.g., any glassy material such as fused silica layer having an index of refraction of about 1.46). The output of the mathematical model provides the penetration depth, $d_p$.

Since all of the parameters are known except for D in the equations above, the diffusion coefficient D may be calculated for a given analyte into a given polymer.

An exemplary method of the present invention for measuring a diffusion rate of an analyte into a polymer may comprise one or more of the following steps:
positioning a test sample of a polymer within a test sample region of an optical waveguide interferometer;
positioning a reference sample of the polymer within a reference sample region of the optical waveguide interferometer;
passing a first beam of light though the test sample region to produce a sensing beam of light exiting the optical waveguide interferometer;
passing a second beam of light through the reference sample region to produce a reference beam of light exiting the optical waveguide interferometer;
optically combining a first propagating light speed of the sensing beam of light with a second propagating light speed of the reference beam of light to create an interference pattern of alternating dark and light fringes;
processing the interference pattern with a two-dimensional (2D) array detector to measure a signal output;
converting the signal output to a phase change output using a Fourier transform software; and
calculating a diffusion rate (i.e., a diffusion coefficient D) for the first analyte into the first polymer as described above.

Figure 4:
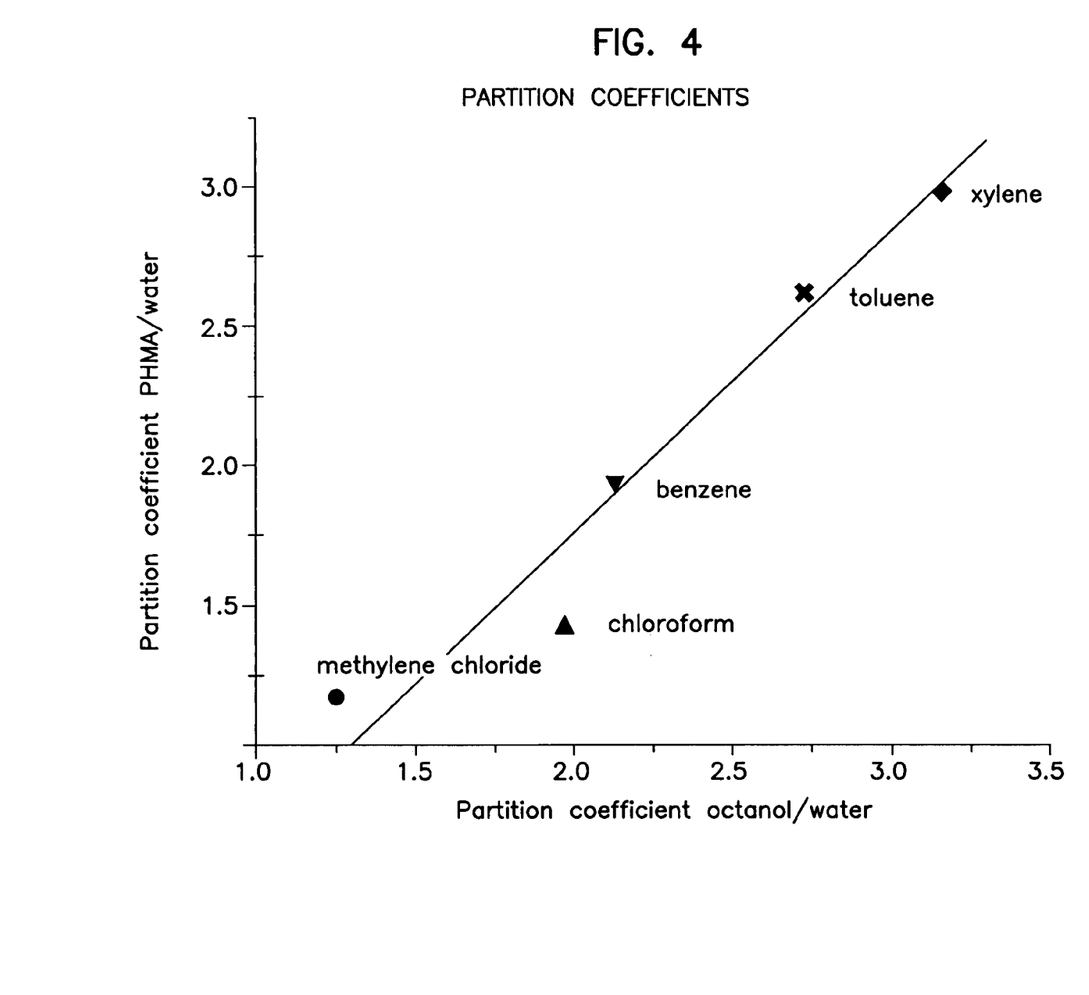
FIG. 4 depicts a graph detailing partition coefficient data of various analytes into poly(n-hexylmethacrylate) using the method of the present invention.

Further, the method of the present invention may be used to measure partition coefficients of a given analyte/polymer combination. When an analyte and a polymer are in equilibrium with one another, partition coefficients of the analyte/polymer combination may be obtained using the above-described mathematical relationships. FIG. 4 graphically displays exemplary partition coefficient date obtained using the method of the present invention.

From (i) the total amount of phase change at equilibrium (i.e., $\Phi_{eq}$, the amount of phase change at equilibrium) measured in radians or r radians, and (ii) the known amount of phase change per amount of refractive index change per unit length determined above during the calibration procedure, the final index of refraction of the polymer/analyte combination, z, may be determined. Using the equation (1−B)x+By=z, the amount of analyte in the polymer may be determined. The partition coefficient is a measure of the ratio of the analyte in the introduced flow, be it air or water, and the analyte in the polymer. From initial analyte concentration levels in the fluid stream and the amount of analyte in the polymer, a partition coefficient may be determined.

II. Methods of Making Filter Media

The present invention is further directed to methods of making filter media. One exemplary method of making a filter media of the present invention comprises (i) measuring a diffusion rate of a first analyte into a first polymer using an optical planar waveguide interferometer; and (ii) if the diffusion rate of the first analyte into the first polymer as measured by the optical planar waveguide interferometer is greater than or equal to a desired diffusion rate value, incorporating the first polymer into a sorbent system of a filter media. The method of may further comprise the steps of (iii) if the diffusion rate of the first analyte into the first polymer as measured by the optical planar waveguide interferometer is less than the desired diffusion rate value, measuring a diffusion rate of the first analyte into each polymer within a group of additional polymers comprising at least one polymer other than the first polymer using an optical planar waveguide interferometer; (iv) if the diffusion rate of the first analyte into a second polymer within the group of additional polymers is greater than or equal to the desired diffusion rate value as measured by the optical planar waveguide interferometer, incorporating the second polymer into a sorbent system of a filter media. The desired diffusion rate value used to decide whether or not to incorporate a given polymer into a filter media may be set at any desired value. In one exemplary embodiment of the present invention, the diffusion rate threshold value is at least about $10^{-8}$ $cm^2$/sec.

The method for forming a filter media may further comprise any of the following steps: (a) measuring a glass transition temperature, $T_g$, of the first polymer; and (b) if (i) the diffusion rate of the first analyte into the first polymer is greater than or equal to a desired diffusion rate value and (ii) the $T_g$ of the first polymer is less than or equal to a desired $T_g$ value, incorporating the first polymer into the absorptive system of a filter media. Like the desired diffusion rate value, the desired $T_g$ value may be set at any desired value. In one exemplary embodiment of the present invention, the desired $T_g$ value is less than or equal to about 20° C.

The exemplary method of making a filter media of the present invention may further comprise one or more of the following steps:
(1) selecting a polymer matrix material based on diffusivity and/or $T_g$;
(2) selecting a polymer matrix material having (i) a diffusivity of greater than $10^{-8}$ $cm^2$/sec, and (ii) a $T_g$ of less than about 20° C.;
(3) selecting one or more reactive additives to be combined with one or more polymer matrix materials;
(4) selecting one or more non-reactive additives to be combined with one or more polymer matrix materials;
(5) combining one or more reactive additives with one or more polymer matrix materials;
(6) combining one or more non-reactive additives with one or more polymer matrix materials;
(7) distributing one or more reactive additives within one or more polymer matrices;
(8) positioning one or more reactive additives proximate to, but separate from, one or more polymer matrices;
(9) distributing one or more non-reactive additives within one or more polymer matrices;
(10) positioning one or more non-reactive additives proximate to, but separate from, one or more polymer matrices;
(11) incorporating one or more incompatible reactive additives into the same filter media;
(12) physically separating one or more incompatible reactive additives from one another within the same filter media;
(13) incorporating a first reactive additive into a first polymer matrix material, and incorporating a second reactive additive into a second polymer matrix material, wherein the first reactive additive is incompatible with the second reactive additive;
(14) combining a sorbent material with an optional substrate;
(15) coating at least one polymeric matrix material onto an optional substrate during one or more coating steps;
(16) drying a coating applied to an optional substrate;
(17) foaming at least one polymeric matrix material; and
(18) incorporating at least one polymeric matrix material into an optional housing.

It should be understood that the methods of making filters of the present invention may include one or more of any of the above-described method steps. For example, multiple coating steps may be used to increase the amount of a given coating on a given substrate or to provide multiple different coatings on a given substrate. Further, multiple drying steps may be used to provide intermediate and final dried coatings on a given substrate.

The resulting filters may comprises one or more of the following components: a sorbent material, such as a polymer matrix selected by the method described above; one or more optional additives, such as reactive additives and non-reactive additives; an optional substrate for supporting the sorbent material and/or optional additives; and an optional containment device for encompassing one or more of the filter components. A description of each filter component is provided below.

A. Absorptive System

As used herein, the term "absorptive system" is used to describe the materials for forming an absorbent component of the filter media of the present invention. The term "absorptive systems" includes sorbent material and any additives combined with the sorbent material. The term "absorptive systems" does not include an optional substrate or any optional housing. Suitable exemplary absorptive systems are described below.

1. Sorbent Material

The sorbent material used to form the absorptive system for the filters of the present invention is desirably a polymer matrix comprising one or more polymeric materials having a desired diffusivity (or diffusion coefficient D). In one embodiment of the present invention, the polymer matrix is substantially free of polymer cross-linking or completely free of polymer cross-linking. As used herein, the phrase "substantially free of polymer cross-linking" refers to a polymer matrix having no cross-linking between polymer chains or a negligible amount of cross-linking within the polymer matrix. The phrase "substantially free of polymer cross-linking" is also used to refer to a polymer matrix, wherein the polymer matrix is formed without the use of cross-linking agents or any other polymerization reaction component that results in polymer cross-linking.

A variety of polymers may be used to form the sorbent material of the filter media of the present invention. It has been determined through computer modeling of the absorptive air filtration phenomenon, that polymeric materials having a diffusivities of at least $10^{-8}$ $cm^2$/sec achieve significant single pass reductions in volatile compounds contained within an air stream. Further, it has been determined that polymeric materials that possess a glass transition temperature, $T_g$, lower than about room temperature (i.e., about 20° C.) possess increased capacity for sorption of volatile compounds, and simultaneously exhibit a reduced sensitivity of molecule size on diffusion constants. Thus, these two criteria (i.e., diffusivities greater than about $10^{-8}$ $cm^2$/sec and $T_g$ less than about 20° C.) serve as one desired method of selecting polymer matrices particularly suitable for use as absorption media.

A number of commercially available polymers meeting the two desired criteria above may be employed as absorbents for air stream contaminants in the filter media of the present invention. Examples of suitable polymer matrices include, but are not limited to, polyethylene/polypropylene random copolymers, poly(dimethylsiloxane), styrene-butadiene random and block copolymers, and the like. The two desired criteria above may also be met by plasticizing a number of other commercially available polymeric systems, such as poly(vinyl chloride) plasticized with dioctyl phthalate, poly(acrylamide) plasticized with water and/or glycerol, and the like. Because of the low glass transition temperature of these materials, the materials are inherently flexible. In addition, they generally exhibit excellent adhesive properties. This property allows them to inherently retain particulate materials that come into contact with their surfaces, thus providing a second function of removing particulate material contained in an impinging air stream. Moreover, since this adhesive process occurs at the molecular level, it is not limited by particle size, and can effectively trap and retain a wide range of particle sizes, including particles too small to be trapped by existing fiber-mat based filtration technologies.

Desirably, the polymer matrix of the filter media comprises at least one polymer having (i) a diffusivity of greater than $10^{-8}$ cm$^2$/sec, and (ii) a glass transition temperature, $T_g$, of less than about 20° C. In an exemplary embodiment of the present invention, the polymer matrix comprises one or more polymeric materials, wherein each polymer has (i) a diffusivity of greater than $10^{-8}$ cm$^2$/sec, and (ii) a $T_g$ of less than about 20° C.

As described above, there are a number of suitable polymers for use as the sorbent material in the filter media of the present invention. Other suitable polymers for use as the sorbent material in the filter media of the present invention include, but are not limited to, polymethacrylates, polysaccharides, polyethylene glycols, polyphosphonates, polyphosphates, poly(glycolic acid), poly(lactic acid), polystyrene sulfonic acid, polyvinyl sulfonic acid, poly(glycolic acid), poly(lactic acid), and poly(acrylic acid), polyethyleneimine, ethoxylated polyethyleneimine, and poly(2-vinylphenol), polymethacrylates, poly(2-hydroxyethyl methacrylate), polypentaerythritol ethoxylate, poly(N,N-dimethyl-3,5-dimethylene) piperidium chloride, and quaternized polyimidazoline.

The absorptive system used to form filters of the present invention may comprise one or more of the above-described polymers for use as the sorbent material. In one exemplary embodiment of the present invention, the absorptive system used to form filters of the present invention comprises one or more of the above-described polymers in combination with one or more optional additives described below. Typically, the absorptive system used to form filters of the present invention comprises from about 5 percent by weight (pbw) to about 95 pbw of one or more of the above-described polymers in combination with from about 95 pbw to about 5 pbw of one or more optional additives, based on a total weight of the absorptive system. Desirably, the absorptive system used to form filters of the present invention comprises from about 5 percent by weight (pbw) to about 50 pbw of one or more of the above-described polymers in combination with from about 95 pbw to about 50 pbw of one or more optional additives, based on a total weight of the absorptive system.

b. Optional Additives

A variety of additives may be incorporated into the absorptive system of the filters of the present invention in order to provide one or more desired properties to the resulting filter. Suitable additives include reactive additives and non-reactive additives as described below.

i. Reactive Additives

One or more reactive additives (also referred to herein as "scavenging agents" or "sequestering agents") may be incorporated into the absorptive system used to form filters of the present invention. Typically, the one or more reactive additives are incorporated into the absorptive system to form a uniform distribution of reactive additives within the polymer matrix. Alternatively, one or more reactive additives may be positioned within the absorptive system such that a non-uniform distribution of reactive additives is present. For example, a layer of reactive additives may be positioned between two outer layers of polymer material, or an outer surface of the polymeric material may be coated with one or more reactive additives. In other embodiments, a layer of reactive additives may be present separate from the polymer matrix of the absorptive system.

A variety of reactive additives may be used in the present invention. Suitable reactive additives include, but are not limited to, catalytic reactants, stoichiometric reactants, catalytic/stoichiometric reactants, acid-scavenging agents, base-scavenging agents, reactive nanoparticles, or a combination thereof. Suitable catalytic reactants include, but are not limited to, strong acids, strong bases, transition metals (e.g., Cu), transition metal salts (e.g., cupric chloride), or a combination thereof. Suitable stoichiometric reactants include, but are not limited to, strong acids (e.g., sulfonic acid, some carboxylic acids, phosphoric acids, and some benzoic acids), weak acids (e.g., some carboxylic acids, and some benzoic acids), strong bases (e.g., NaOH), weak bases (e.g., ethylenediamine, amines, and $Na_2CO_3$), primary amines (e.g., triethylamine), or a combination thereof. Water may also be considered a reactive additive due to its interaction with the polymer matrix when acidic or basic reactive additives are present.

In one desired embodiment of the present invention, the reactive additives comprise functionalized ethylenediamine beads. The functionalized ethylenediamine beads may be ethylenediamine beads that have one or more amine groups replaced with another functional group. Suitable substitute functional groups include, but are not limited to, trialkyl amine moieties having a chemical structure of —NR$_1$R$_2$R$_3$ wherein each R group can independently comprise a hydrogen or an alkyl group having up to about 8 carbon atoms, and at least one R group is not hydrogen; a halogen moiety, such as —F; and an acid anion moiety, such as formic acid anion (—COO$^-$).

When present within the absorptive system, the reactive additives react with one or more volatile contaminant species absorbed into the absorptive system to form one or more non-volatile reaction products. In this embodiment, the non-volatile reaction products are permanently fixed within the absorptive system preventing escape from the absorptive system of the absorbed volatile contaminant species.

The optional reactive additives enable the production of absorptive system specifically designed to remove a desired contaminant from a fluid stream. The reactive additives provide flexibility for use in filtration applications since the resulting absorptive system is capable of at least the following reactions: (i) oxidation reactions on an outer surface of the polymer matrix, and (ii) hydrolysis reactions, acid/base reactions, condensation reactions, nucleophilic reactions, and electrophilic reactions within a bulk volume of the polymer matrix.

The above-mentioned catalytic scavenging/sequestering agents promote the reaction of one or more absorbed volatile compounds with one or more other components of an air stream, where the one or more other components include, but are not limited to, water, oxygen, and combinations thereof. Examples of reactions promoted by these catalysts include hydrolysis of esters, oxidation of aldehydes and mercaptans, decomposition of peroxides and ozone, and the like. In this embodiment, the scavenger itself is not consumed, and the amount of volatile compound scavenged may be much greater than the amount of catalytic scavenging agent(s) present.

The above-mentioned stoichiometric scavenging agents are consumed by reacting with one or more absorbed volatile compounds. Examples of stoichiometric reactions include neutralization of absorbed acids by weak and strong bases (such as reaction of caproic acid with an amine); neutralization of absorbed bases by weak and strong acids (such as neutralization of nicotine or ammonia by a sulfonic acid); chelation of volatile phosphorus compounds by metal salts (such as formation of copper phosphide by reaction of phosphine with copper salts); and the like.

In commercial and/or industrial applications, it may be desirable to remove many different volatile and semivolatile species from a fluid stream. To meet such demand, the absorptive system used to form filters of the present invention may include more than one type of reactive additive or scavenging agent in the absorptive polymeric matrix. In one desired embodiment, the absorptive system contains several different scavenging agents with the scavenging agents being catalytic, stoichiometric, or both catalytic and stoichiometric reactants. Moreover, it may be desirable to scavenge volatile and semivolatile compounds that possess non-compatible functional groups. For example, it may be desirable to scavenge both acids (such as, for example, caproic acid) simultaneously with bases (such as, for example, nicotine). The absorptive system used to form filters of the present invention may be designed to remove these disparate compounds simultaneously from an air stream by physically separating acid-scavenging agents from base-scavenging agents within the same filter.

Physical separation of incompatible reactive additives or scavenging agents may be accomplished by binding the respective acidic and basic functionalities to polymeric supports, which are physically separated from one another within the polymeric matrix (i.e., proton transport cannot take place between the physically separated supports). An even greater degree of separation can be achieved by placing multiple layers of the absorptive polymeric matrix into a combined filtration system, wherein each layer contains different, incompatible scavengers and the layers are physically separated from one another to prevent proton transport between the layers.

In one exemplary embodiment of the present invention, a combination of acid-scavenging agents and base-scavenging agents is physically present within the same absorptive system. In this embodiment, the acid-scavenging agents are physically separated from the base-scavenging agents in order to avoid premature reaction with one another within the absorptive system. As described above, layers of specific reactive additives, such as a layer of acid-scavenging agents and a separate layer of base-scavenging agents, may be incorporated within separate layers of polymer matrix material. Alternatively, separate layers of reactive reagents, such as a layer of acid-scavenging agent and a layer of base-scavenging agent, may be present physically separated from a polymer matrix altogether.

In other embodiments of the present invention, the filters of may comprise an absorptive system containing a single polymeric matrix with acid-scavenging agents and base-scavenging agents in combination with one another and present within or in contact with the single polymeric matrix. Consequently, in some embodiments of the present invention, it is not necessary to physically separate the acid-scavenging agents and the base-scavenging agents from one another.

In a further exemplary embodiment of the present invention, reactive nanoparticles are incorporated into the absorptive system. Suitable commercially available reactive nanoparticles for use in the present invention include, but are not limited to, reactive nanoparticles available from NanoScale Materials, Inc. (Manhattan, Kans.) under the trade designation NanoActive™. At least the following NanoActive™ products may be used in the present invention: NanoActive™ Calcium Oxide, NanoActive™ Calcium Oxide Plus, NanoActive™ Cerium (IV) Oxide, NanoActive™ Magnesium Oxide, NanoActive™ Magnesium Oxide Plus, NanoActive™ Titanium (IV) Oxide, NanoActive™ Zinc Oxide, NanoActive™ Aluminum Oxide, NanoActive™ Aluminum Oxide Plus, and NanoActive™ Copper Oxide.

When present, the reactive additives are typically present in an amount of up to about 50 parts by weight based on a total weight of the absorptive system. Typically, the reactive additives are present within the absorptive system in an amount ranging from about 3 to about 30 percent by weight based on a total weight of the absorptive system.

ii. Non-Reactive Additives

The absorptive system used to form filters of the present invention may also include one or more optional non-reactive additives. Suitable non-reactive additives include, but are not limited to, water, glycerol, sorbitol, other alcohols, hygroscopic compounds, inert filler material for increasing overall surface area of absorptive system, or a combination thereof. In one desired embodiment of the present invention, the absorptive system comprises a polymer matrix containing the following components: a high molecular weight poly(acrylamide) having a weight average molecular weight ranging from about 1 million to about 50 million; a reactive additive in the form of sorbitol; and non-reactive additives comprising a combination of water and glycerol and sorbitol.

When present, the non-reactive additives may be present in an amount of up to about 50 percent by weight based on a total weight of the absorptive system used to form the filter.

B. Optional Substrates for Supporting the Absorptive System

The absorptive system used to form filters of the present invention may be applied onto an optional support or substrate to provide enhanced structural integrity to the absorptive system. Suitable substrates include, but are not limited to, non-woven fabrics, woven fabrics, knitted fabrics, films, foams, honeycomb supports (e.g., polymeric honeycombs), particulates, meshes or screens, fibers, flakes, powders, wood products, papers, glass, ceramics, beads, plywood, gypsum board, ceiling tiles, or any combination thereof. Suitable materials for forming substrates in the form of non-woven fabrics, woven fabrics, knitted fabrics, films, foams, honeycomb supports, particles, meshes, screens and fibers include, but are not limited to, polyolefins, such as polyethylene and polypropylene, polyesters, polyamides, such as Nylon 6 and Nylon 66, and cellulosics. When present, the optional substrate for supporting the absorptive system is desirably a non-woven fabric, which is coated by the absorptive system. In one desired embodiment of the present invention, the optional substrate comprises a polyamide non-woven fabric.

The amount of absorptive system coated onto a given substrate may vary depending on a number of factors including, but not limited to, the type of absorptive system, the type of substrate, and the desired use of the filter. Typically, when a substrate is present, the amount of absorptive system coating ranges from about 0.5 to about 8.0 parts by weight of coating for each part by weight of substrate.

Desirably, when a substrate is present, the amount of absorptive system coating ranges from about 1.0 to about 5.0 parts by weight of coating for each part by weight of substrate, more desirably, from about 2.0 to about 3.0 parts by weight of coating for each part by weight of substrate.

The absorptive system coating may be present as a continuous or discontinuous coating on a given substrate. Desirably, the absorptive system coating is a continuous coating, which (i) encapsulates substrates such as particulates, powders, flakes, or beads, or (ii) completely coats a given surface of substrates such as films, sheets, paper, meshes, screens, fibers, foams, honeycomb, or fabrics.

C. Optional Housing for the Absorptive System

The filters of the present invention may further comprise an optional housing to provide structural integrity to the filter components. The housing may at least partially enclose one or more layers of polymeric matrix material of the filter media. The housing may be constructed of any material, which provides support for the filter components. Suitable materials for forming the housing include, but are not limited to, plastics, glass, metal, wood, ceramics, paper, cardboard, or any combination thereof. Typically, the optional housing comprises one or more housing components formed from polymers including, but are not limited to, polyolefins, such as polyethylene and polypropylene, polyesters, polyamides, such as nylon 6 and nylon 66, and cellulosics. Housing components may include, but are not limited to, a housing frame (i.e., the outer perimeter frame of a filter housing), one or more grids or screens along the fluid flow path of the filter, and a cover for allowing access to the absorptive system within the filter housing.

The optional housing may comprise a housing similar to that used for activated carbon filters. In one embodiment of the present invention, glass beads having a bead diameter of up to about 5 mm, desirably from about 0.6 to about 1.5 mm, may be coated with sorbent polymeric material and then poured into a housing similar to that used for activated carbon filters. Housing for activated carbon filters typically comprise a plastic housing material, a front plastic mesh or screen, and a back plastic mesh or screen for encapsulating the absorptive system (e.g., a plastic mesh or screen along outer surfaces of the filter to allow fluid flow therethrough).

In a further embodiment of the present invention, polymeric beads (e.g., sequestering agent in the form of beads) having a bead diameter of up to about 5 mm, desirably from about 0.6 to about 1.5 mm, may be coated with sorbent polymeric material and then poured into a housing similar to that used for activated carbon filters as described above.

D. Filter Configuration

The components of the filters of the present invention may be configured in any manner so as to remove one or more contaminants from a fluid stream. For example, in some embodiments of the present invention, a fluid stream is simply brought into contact with a filter of the present invention. Such a configuration does not require the fluid stream to pass through the absorptive system, but only come into contact with the absorptive system. An example of such a configuration is a simple coating of absorptive system onto a substrate. In other embodiments of the present invention, the fluid stream flows through the absorptive system.

Consequently, in some aspects of the present invention, an absorptive system is simply coated onto any given surface, similar to a coating of paint, to provide a two-dimensional (i.e., film-like) absorptive filtering system. In this embodiment, the absorptive system may be coated onto any surface (interior or exterior) of a room, building, or any of the above-mentioned substrates. As a fluid stream (e.g., air) passes over the film-like coating, the two-dimensional absorptive filtering system removes unwanted components from the fluid stream.

In other embodiments of the present invention, the absorptive system is coated onto a three-dimensional structure (i.e., a nonwoven fabric or honeycomb structure) resulting in a three-dimensional absorptive filtering system. As a fluid stream (e.g., air) passes over and/or through the three-dimensional structure, the three-dimensional absorptive filtering system removes unwanted components from the fluid stream.

III. Methods of Using Filter Media To Remove One Or More Contaminants

The present invention is also directed to methods of using filters to remove particles and/or one or more of the above-described contaminants from a fluid stream. One exemplary method for removing particles and/or one or more volatile or semivolatile compounds from a fluid stream comprises bringing the fluid stream and a filter of the present invention in contact with one another. As discussed above, the contacting step may simply require the fluid stream to contact a portion of the absorptive system. In some embodiments, the contacting step may comprise passing the fluid stream through a portion of the absorptive system.

The exemplary method for removing one or more volatile or semivolatile compounds from a fluid stream may further comprise one or more of the following steps:

(1) positioning a filter media of the present invention proximate to a fluid stream;

(2) incorporating a filter media of the present invention into an air filtration system;

(3) incorporating a filter media of the present invention into an air filtration system, wherein the air filtration system comprises a face mask, a body suit, an air conditioning system, ductwork of a building or vehicle, an air recirculation system of a vehicle or airplane, a military vehicle, or a combination thereof;

(4) matching specific components of the filter media with specific contaminants or compounds that are to be removed from a fluid stream; and (5) making a filter media to specifically remove a given contaminant or compound.

Selection of particular absorptive polymeric matrices and scavenger systems is dependent on the end-use criteria for the fluid (e.g. air) filtration system. In some applications, removal of trace amounts of volatile and semivolatile compounds may be desired, while in other applications the ability to remove high concentrations of one or more contaminants or compounds may be desired. Other performance criteria may include, but are not limited to, the temperature and humidity of the incoming air, the expected service life of the absorptive polymeric matrix, the cost of the total absorption system, the degree of one-pass removal desired, and whether the filter is expected to be reused, or merely replaced.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of making a filter media, said method comprising the steps of:
    measuring a diffusion rate of a first analyte into a first polymer using an optical planar waveguide interferometer; and
    if the diffusion rate of the first analyte into the first polymer as measured by the optical planar waveguide interferometer is greater than or equal to a desired diffusion rate value, incorporating the first polymer into an absorptive system of a filter media.

2. The method of claim 1, further comprising the steps of:
    if the diffusion rate of the first analyte into the first polymer as measured by the optical planar waveguide interferometer is less than the desired diffusion rate value,
        measuring a diffusion rate of the first analyte into each polymer within a group of additional polymers comprising at least one polymer other than the first polymer using an optical planar waveguide interferometer;
        if the diffusion rate of the first analyte into a second polymer within the group of additional polymers is greater than or equal to the desired diffusion rate value as measured by the optical planar waveguide interferometer, incorporating the second polymer into the absorptive system of a filter media.

3. The method of claim 1, wherein the desired diffusion rate value is greater than or equal to $10^{-8}$ cm2/sec.

4. The method of claim 1, further comprising:
    measuring a glass transition temperature, $T_g$, of the first polymer; and
    if (i) the diffusion rate of the first analyte into the first polymer is greater than or equal to a desired diffusion rate value and (ii) the $T_g$ of the first polymer is less than or equal to a desired $T_g$ value, incorporating the first polymer into the absorptive system of a filter media.

5. The method of claim 4, wherein the desired diffusion rate value is greater than or equal to $10^{-8}$ cm$^2$/ sec and the desired $T_g$ value is less than or equal to about 20° C.

6. The method of claim 1, wherein the absorptive system of the filter media comprises at least one polymer having a diffusion rate of the first analyte into the at least one polymer as measured by the optical planar waveguide interferometer of greater than or equal to the desired diffusion rate value.

7. The method of claim 6, wherein the absorptive system of the filter media comprises at least one additional polymer in combination with the at least one polymer having a diffusion rate of the first analyte into the at least one polymer as measured by the optical planar waveguide interferometer of greater than or equal to the desired diffusion rate value.

8. The method of claim 1, further comprising the steps of:
    incorporating one or more reactive additives into the absorptive system of the filter media.

9. The method of claim 8, wherein the one or more reactive additives comprises reactive nanoparticles.

10. The method of claim 1, wherein the step of measuring the diffusion rate of a first analyte into a first polymer using an optical planar waveguide interferometer comprises:
    measuring a phase change in a sensing beam of light relative to a reference beam of light; and
    determining the diffusion rate of the first analyte into the first polymer from the phase change.

11. The method of claim 10, wherein the step of measuring a phase change in a sensing beam of light relative to a reference beam of light comprises:
    optically combining a first propagating light speed of the sensing beam of light with a second propagating light speed of the reference beam of light to create an interference pattern of alternating dark and light fringes;
    imaging the interference pattern via a two-dimensional array detector to produce a signal output;
    converting the signal output to a phase change output using a Fourier transform program.

12. A method of removing one or more volatile or semi-volatile compounds from a fluid stream, said method comprising:
    bringing the fluid stream and the filter media formed from the method of claim 1 into contact with one another.

13. A method for measuring a diffusion rate of a first analyte into a first polymer, said method comprising:
    positioning a test sample of the first polymer within a test sample region of an optical waveguide interferometer;
    positioning a reference sample of the first polymer and the first analyte within a reference sample region of the optical waveguide interferometer;
    passing a first beam of light through the test sample region to produce a sensing beam of light exiting the optical waveguide interferometer while simultaneously passing a second beam of light through the reference sample region to produce a reference beam of light exiting the optical waveguide interferometer;
    optically combining a first propagating light speed of the sensing beam of light with a second propagating light speed of the reference beam of light to create an interference pattern of alternating dark and light fringes;
    imaging the interference pattern through a two-dimensional array detector to produce a signal output;
    converting the signal output to a phase change output using a Fourier transform program; and
    determining the diffusion rate of the first analyte into the first polymer from the phase change.

14. The method of claim 13, wherein the first beam of light and the second beam of light result from beam splitting a light beam from a laser beam source.

15. The method of claim 13, wherein the apparatus used to measure the diffusion rate of the first analyte into the first polymer comprises:
    a laser beam source;
    optional beam splitting means for producing at least two beams of light from a single incoming beam of light;
    an optical waveguide interferometer;
    a test sample region of the optical waveguide interferometer;
    a reference sample region of the optical waveguide interferometer;
    a lens for combining (i) a sensing beam of light exiting the test sample region of the optical waveguide interferometer with (ii) a reference beam of light exiting a reference sample region of the optical waveguide interferometer;
    an optional microscope objective for producing an interference pattern of alternating dark and light fringes from (i) a first propagating light speed of the sensing beam of light and (ii) a second propagating light speed of the reference beam of light;
    a two-dimensional array detector for imaging the interference patter and producing a signal output; and
    a Fourier transform program for converting the signal output to a phase change output.

* * * * *